US012273253B2

(12) United States Patent
Chakraborty et al.

(10) Patent No.: US 12,273,253 B2
(45) Date of Patent: Apr. 8, 2025

(54) ON-DEVICE MACHINE LEARNING-BASED NETWORK BANDWIDTH PREDICTION TO IMPROVE ADAPTIVE MEDIA STREAMING PERFORMANCE

(71) Applicant: Apple Inc., Cupertino, CA (US)

(72) Inventors: Soutik Chakraborty, Sunnyvale, CA (US); John Y. Su, Saratoga, CA (US); Eunhee Lim, Santa Clara, CA (US); Jacob A. Baron, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/184,316

(22) Filed: Mar. 15, 2023

(65) Prior Publication Data

US 2024/0314054 A1    Sep. 19, 2024

(51) Int. Cl.
*H04L 43/0888* (2022.01)
*H04L 41/16* (2022.01)
*H04L 65/60* (2022.01)

(52) U.S. Cl.
CPC .......... *H04L 43/0888* (2013.01); *H04L 41/16* (2013.01); *H04L 65/60* (2013.01)

(58) Field of Classification Search
CPC ..... H04L 41/14; H04L 41/16; H04L 43/0888; H04L 65/60; H04L 65/752
See application file for complete search history.

(56) References Cited

U.S. PATENT DOCUMENTS 5,128,932 A    7/1992  Li et al.
5,475,682 A   12/1995  Choudhury et al.
(Continued)

FOREIGN PATENT DOCUMENTS

EP    1079630 A1    2/2001
JP    H11-187367 A  7/1999
(Continued)

OTHER PUBLICATIONS

"Random Forests Leo Breiman and Adele Cutler"; https://www.stat.berkeley.edu/~breiman/RandomForests/; accessed Mar. 22, 2023; one page.

(Continued)

*Primary Examiner* — Jeong S Park
(74) *Attorney, Agent, or Firm* — BakerHostetler

(57) ABSTRACT

A media streaming method is disclosed in which a network environment of a sink device engaged in media streaming is estimated and at least two network throughput estimates are developed. A first network throughput estimate may be estimated from a measurement of network performance and a second network throughput estimate may be developed from a correlation of the estimated network environment to a machine learning model representing network throughput predictions. A final throughput estimate may be developed from the first and second network throughput estimates; and a representation of media content may be selected for retrieval based on the final throughput estimate. The machine learning model of network throughput may be developed over the course of prior media streaming session(s) that are performed by the sink device in which network throughput performance indicators of the streaming session(s) are stored over a predetermined interval and, upon conclusion of the interval, the model of network throughput is constructed according to a machine learning technique. Both the logging network throughput performance indicators and the building of the model of network throughput may be performed solely by the sink device, which preserves confidentiality of data representing consumer behavior during those media streaming sessions.

19 Claims, 2 Drawing Sheets

(56) References Cited

U.S. PATENT DOCUMENTS

| | | | |
|---|---|---|---|
| 5,502,494 | A | 3/1996 | Auld |
| 5,565,924 | A | 10/1996 | Haskell et al. |
| 5,586,264 | A | 12/1996 | Belknap et al. |
| 5,754,241 | A | 5/1998 | Okada et al. |
| 5,768,258 | A | 6/1998 | Van As et al. |
| 5,793,412 | A | 8/1998 | Asamizuya |
| 5,822,524 | A | 10/1998 | Chen et al. |
| 5,838,678 | A | 11/1998 | Davis et al. |
| 5,847,760 | A | 12/1998 | Elmaliach et al. |
| 5,881,245 | A | 3/1999 | Thompson |
| 5,913,031 | A | 6/1999 | Blanchard |
| 5,931,922 | A | 8/1999 | Hough |
| 5,938,749 | A | 8/1999 | Rusu et al. |
| 5,966,385 | A | 10/1999 | Fujii et al. |
| 5,982,436 | A | 11/1999 | Balakrishnan et al. |
| 6,041,345 | A | 3/2000 | Levi et al. |
| 6,154,496 | A | 11/2000 | Radha |
| 6,314,466 | B1 | 11/2001 | Agarwal et al. |
| 6,359,885 | B1 | 3/2002 | Kim et al. |
| 6,393,057 | B1 | 5/2002 | Thoreau et al. |
| 6,411,617 | B1 | 6/2002 | Kilkki et al. |
| 6,480,541 | B1 | 11/2002 | Girod et al. |
| 6,542,546 | B1 | 4/2003 | Vetro et al. |
| 6,628,712 | B1 | 9/2003 | Le Maguet |
| 6,637,031 | B1 | 10/2003 | Chou |
| 6,822,960 | B1 | 11/2004 | Manchester et al. |
| 6,842,724 | B1 | 1/2005 | Lou et al. |
| 7,009,968 | B2 | 3/2006 | Ambe et al. |
| 7,111,058 | B1 | 9/2006 | Nguyen et al. |
| 7,199,836 | B1 | 4/2007 | Eleftheriadis et al. |
| 7,293,107 | B1 | 11/2007 | Hanson et al. |
| 7,373,413 | B1 | 5/2008 | Nguyen et al. |
| 7,424,730 | B2 | 9/2008 | Chou |
| 11,343,551 | B1* | 5/2022 | Brailovskiy ..... H04N 21/23439 |
| 2001/0009548 | A1 | 7/2001 | Morris |
| 2001/0053281 | A1 | 12/2001 | Kashiwagi et al. |
| 2002/0194361 | A1 | 12/2002 | Itoh et al. |
| 2005/0123058 | A1 | 6/2005 | Greenbaum et al. |
| 2005/0185675 | A1 | 8/2005 | Sakamoto et al. |
| 2013/0103849 | A1* | 4/2013 | Mao .................. H04N 21/8456 709/231 |
| 2018/0234302 | A1* | 8/2018 | James ..................... G06N 20/00 |
| 2022/0012293 | A1* | 1/2022 | Zimmerman ....... G06F 16/9535 |
| 2023/0064266 | A1* | 3/2023 | Krishnan ............... H04W 24/02 |
| 2023/0131468 | A1* | 4/2023 | Amer ..................... H04L 41/16 455/423 |
| 2024/0014910 | A1* | 1/2024 | Zhang .................. H04B 17/309 |
| 2024/0107359 | A1* | 3/2024 | Jia ..................... H04W 28/0242 |

FOREIGN PATENT DOCUMENTS

| | | |
|---|---|---|
| KR | 10-0246627 B1 | 3/2000 |
| WO | WO 1997/008898 A1 | 3/1997 |

OTHER PUBLICATIONS

J. Friedman; "Greedy Function Approximation: a Gradient Boosting Machine"; The Annals of Statistics; vol. 29; Oct. 2001; 39 pages.

Buddhikot et al.; "Scalable Multimedia-On-Demand via World-Wide-Web (WWW) with QOS Guarantees"; $6^{th}$ Int'l Workshop on Network and Operating Systems; 1996; 8 pages.

S. Acharya; "Techniques for Improving Multimedia Communication Over Wide Area Networks"; Cornell University; Dissertation Thesis; Jan. 1999; 174 pages.

Lounis et al.; "Neural Network Model of QoE for Estimation Video Streaming over 5G network"; 6th International Workshop on ADVANCEs in ICT Infrastructures and Services (ADVANCE); Jan. 2018; p. 21-27.

A. Biernacki; "Improving Streaming Video with Deep Learning-Based Network Throughput Prediction"; Applied Sciences; vol. 12; 2022; 19 pages.

Bolot et al.; "A Rate Control Mechanism for Packet Video in the Internet"; Proceedings of INFOCOM Conf. on Computer Communications; 1994; p. 1216-1223.

Bolot et al.; "Scalable Feedback Control for Multicast Video Distribution in the Internet"; SIGCOMM—Proceedings of the Conf. on Communications Architectures, Protocols and Applications; 1994; p. 58-67.

Busse et al.; "Dynamic QoS Control of Multimedia Applications based on RTP"; Computer Communications; vol. 19; 1996; 13 pages.

Byers et al.; "FLID-DL: Congestion Control for Layered Multicast"; COMM—Proceedings of NGC on Networked Group Communication; 2000; p. 71-81.

Zheng et al.; "Multimedia Over High Speed Networks: Reducing Network Requirements With Fast Buffer Fillup"; IEEE Global Telecommunications; 1998; p. 779-784.

Wang et al.; "Comparison of Adaptive Internet Multimedia Applications"; IEICE Trans. Comm.; vol. E82-B No. 6; Jun. 1999; p. 806-818.

Robinson et al.; "Congestion Control in BBN Packet-Switched Networks"; ACM SIGCOMM Computer Communication Review; vol. 20(1); 1989; p. 76-90.

Conklin et al.; "Video Coding for Streaming Media Delivery on the Internet"; IEEE Transactions on Circuits and Systems for Video Technology; vol. 11 No. 3; Mar. 2001; p. 269-281.

Ebrahimi et al.; "MPEG-4 natural video coding—an overview"; Signal Processing: Image Communication; vol. 15; 2000; p. 365-385.

"Embedded Realplayer® Extended Functionality Guide—RealSystem™ G2"; Real Networks; Dec. 1998; 38 pages.

Gaglianello et al.; "Applications of Scalable Multipoint Video and Audio Using the Public Internet"; Informing Science Special Issue on Multimedia Informing Technologies—Part 2; vol. 3 No.1; 2000; p. 9-14.

Girod et al.; "Internet Video-Streaming"; Multimedia Communications; 1999; p. 547-556.

G. Karlsson; "Providing Quality for Internet Video Services"; Multimedia Communications; 1999; p. 133-146.

Series H: Audiovisual and Multimedia Systems Infrastructure of audiovisual services—Transmission multiplexing and synchronization—Call signalling protocols and media stream packetization for packet-based multimedia communication systems; ITU-TH.225.0; International Telecommunication Union; Nov. 2000; 251 pages.

Series H: Audiovisual and Multimedia Systems Infrastructure of audiovisual services—Transmission multiplexing and synchronization—Call signalling protocols and media stream packetization for packet-based multimedia communication systems—Amendment 1: Revised Annex G: Communication between and within administrative domains; ITU-T H.225.0 Amendment; International Telecommunication Union; Nov. 2002; 34 pages.

Hassan et al.; "Simulation-based Performance Comparison of TCP-Friendly Congestion Control Protocols"; Proceedings of the 16th Annual UK Performance Engineering Workshop 2000; 11 pages.

C. Herpel; "Elementary Stream Management in MPEG-4"; IEEE Transactions on Circuits and Systems for Video Technology; vol. 9 No. 2; Mar. 1999; p. 315-324.

Herpel et al.; "MPEG-4 Systems: Elementary stream management"; Signal Processing: Image Communication; vol. 15; 2000; p. 299-320.

Hollfelder et al.; "Designing for Semantic Access: a Video Browsing System"; Multimedia Tools and Applications; vol. 11; 2000; 22 pages.

El-Marakby et al.; "Integrating RTP into the World Wide Web"; World Wide Web Consortium Workshop on Real Time Multimedia and the Web; 1996; 5 pages.

Jeon et al.; "Hybrid Machine Learning Approach to Popularity Prediction of Newly Released Contents for Online Video Streaming Service"; Technological Forecasting and Social Change; vol. 161; Dec. 2020; 11 pages.

J. Kristoffs; "The Transmission Control Protocol"; Apr. 2000; 13 pages.

C. Reader; "History of MPEG Video Compression—Ver. 4.0"; Apr. 2019; 99 pages.

(56) References Cited

OTHER PUBLICATIONS

Merz et al.; "Iterative Transmission of Media Streams"; Proceedings of the 5$^{th}$ ACM Int'l Conf. on Multimedia; 1997; p. 283-290.
T. Kumar; "Video based Traffic Forecasting using Convolution Neural Network Model and Transfer Learning Techniques"; Journal of Innovative Image Processing; vol. 2 No. 3; 2020; p. 128-134.
Lau et al.; "Receiver Buffer Control Variable Bit-Rate Real-Time Video"; SUPERCOMM/ICC Discovering a New World of Communications; 1992; p. 0544-0549.
Lee et al.; "An Integrated Source Coding and Congestion Control Framework for Video Streaming in the Internet"; Proceedings IEEE Infocom; vol. 2; 2000; p. 747-756.
Kim et al.; "Loss Proportional Decrease Based Congestion Control in the Future Internet"; Topology; vol. 10; 1999; 12 pages.
Legout et al.; "Fast Convergence for Cumulative Layered Multicast Transmission Schemes"; Proceedings of ACM SIGMETRICS; Jun. 2000; 27 pages.
Lippman; "Video coding for multiple target audiences"; SPIE; vol. 3653; Jan. 1999; p. 780-782.
J. Lu; "Signal Processing for Internet Video Streaming: a Review"; Proceedings of SPIE Image and Video Communications and Processing; Jan. 2000; 14 pages.
Wang et al.; "Machine Learning for Networking: Workflow, Advances and Opportunities"; IEEE Network; 2017; 8 pages.
B. Karkour; "Machine Learning Implementation on the Client-Side for Adaptive Video Streaming"; Leibniz Universitat Hannover; Master Thesis; Dec. 2019; 73 pages.
Khan et al.; "Machine learning in Dynamic Adaptive Streaming over HTTP (DASH)"; Int'l Journal of Advanced Networking and Applications; vol. 9(3); 2017; p. 3461-3468.
"RealPlayer 8 beta released"; www.macworld.co.uk/mac/news/?newsid=1362; Mac World; May 2000; accessed Jul. 29, 2013; 3 pages.
McCanne et al.; "Low-complexity Video Coding for Receiver-driven Layered Multicast": IEEE Journal on Selected Areas in Communications; vol. 15(6); 1997; 23 pages.
McCanne et al.; "Receiver-driven Layered Multicast"; SIGCOMM—Conf. Proceedings on Applications, Technologies, Architectures and Protocols for Computer Communications; Aug. 1996; 14 pages.
S. McCanne; "Scalable Compression and Transmission of Internet Multicast Video"; Report No. UCB/CSD-96-928; University of California; Computer Science Division; Dec. 1996; 185 pages.
S. McCanne; "Scalable Multimedia Communication with Internet Multicast, Light-weight Sessions, and the MBone"; Technical Report No. UCB/CSD-98-1002; University of California; EECS Department; 1998; 29 pages.
Gerla et al.; "Congestion Control in Interconnected LANs"; IEEE Network; Jan. 1988; p. 72-76.
Miyabayashi et al.; "Implementation of Video Transfer with TCP-friendly Rate Control Protocol"; Proceedings of the IEEK Conf.; 2000; p. 117-120.
Behravesh et al.; "ML-Driven DASH Content Pre-Fetching in MEC-Enabled Mobile Networks"; 16$^{th}$ Int'l Conf. on Network and Service Management; 2020; 7 pages.
Mukherjee et al.; "Time-lined TCP for the TCP-friendly Delivery of Streaming Media"; Int'l Conf. on Network Protocols; 2000; p. 165-176.
Barman et al.; "No-Reference Video Quality Estimation Based on Machine Learning for Passive Gaming Video Streaming Applications"; IEEE Access; vol. 7; 2019; p. 74511-74527.
Padhye et al.; "A Model Based TCP-Friendly Rate Control Protocol"; Proceedings of NOSSDAV; 1999; 15 pages.
Haskell et al.; Digital Video: an Introduction to MPEG-2; Chapman & Hall; ©1997; 76 pages.
Irena Orsolic; "Quality of Experience Estimation of Encrypted Video Streaming by Using Machine Learning Methods"; University of Zagreb; Doctoral Thesis; 2020; 201 pages.
Vasilev et al.; "Predicting QoE Factors with Machine Learning"; IEEE Int'l Conf. on Communications; 2018; 6 pages.
Brieman et al.; "Package 'randomForest'"; https://www.stat.berkeley.edu/~brieman/RandomForests/; Oct. 14, 2022; 29 pages.
Schulzrinne et al.; "Real Time Streaming Protocol (RTSP)"; Network Working Group; Apr. 1998; 92 pages.
Agarwal et al.; "RealMedia File Format"; https://tools.ietf.org/html/draft-heftagaub-rmff-00; Real Networks; Mar. 1998; Accessed Oct. 2, 2013; 18 pages.
"Choosing SureStream or Single Rate Encoding"; https://service.real.com.help/library/blueprints/85codecs/htmfiles/producer2.html; accessed Sep. 27, 2013; 3 pages.
"realplayer™plus" RealPlayer 8 Plus User Manual; RealNetworks Inc.; ©2000; 112 pages.
"Chapter 8: Troubleshooting"; https://service.real.com/help/player/plus_manual.g2/htmfiles/troubles.htm; RealNetworks; ©1998-1999; accessed May 29, 2013; 10 pages.
"Chapter 2: Streaming Media Basics"; https://service.real.com/help/library/guides/mproducerplus/htmfiles/preparing.htm; RealNetworks; ©1998-1999; accessed Jun. 2013; 4 pages.
"Realproducerplus™User's Guide"; Version G2; RealNetworks Inc.; ©1998; 85 pages.
"Realproducerplus™User's Guide"; Version G2 for UNIX; RealNetworks Inc.; ©1998; 53 pages.
"Realproducer Pro™User's Guide"; Version G2; RealNetworks Inc.; ©1998; 68 pages.
"Realproxy G2 Administration Guide"; Beta One; RealNetworks Inc.; ©1999; 124 pages.
"RealServer® Administration and Content Creation Guide"; Version 4.0; Progressive Networks Inc.; ©1995-1997; 366 pages.
"Realserver Administration Guide"; RealServer 7.0 Powered by RealSystem G2; RealNetworks Inc.; ©1998-1999; 462 pages.
"Realsystem™ G2 Production Guide"; RealSystem G2, Release 7; RealNetworks Inc.; ©1998-2000; 244 pages.
"Realsystem™ G2 Syntax Style Guide"; RealNetworks Technical Blueprint Series; RealNetworks Inc.; ©1998; 10 pages.
"Realsystem™ Production Guide"; Release 8; RealNetworks Inc.; ©1998-2000; 260 pages.
Rejaie et al.; "Layered Quality Adaptation for Internet Video Streaming"; IEEE Journal on Selected Areas in Communications; vol. 18 No. 12; Dec. 2000; p. 2530-2543.
Rajaie et al.; "Multimedia Proxy Caching Mechanism for Quality Adaptive Streaming Applications in the Internet"; 19$^{th}$ Annual Joint Conf. of the IEEE Computer and Communications Societies; vol. 2; 2000; p. 980-989.
Rejaie et al.; "Quality Adaptation for Congestion Controlled Video Playback over the Internet"; ACM SIGCOMM Computer Communication Review; vol. 29; 1999; p. 189-200.
Cerf et al.; "Specification of Internet Transmission Control Program"; Network Working Goup; RFC 675; Dec. 1974; 70 pages.
J. Postel; "User Datagram Protocol"; RFC 768; Aug. 1980; 3 pages.
J. Postel; "Internet Control Message Protocol"; Network Working Group; RFC 792; Sep. 1981; 21 pages.
"Transmission Control Protocol"; RFC 793; University of Southern California; Sep. 1981; 89 pages.
J. Nagle; "Congestion Control in IP/TCP Internetworks"; Network Working Group; RFC 896; Jan. 1984; 9 pages.
R. Braden; "Requirements for Internet Hosts—Communication Layers"; Network Working Group; RFC 1122; Oct. 1989; 116 pages.
Schulzrinne et al.; "RTP: A Transport Protocol for Real-Time Applications"; Network Working Group; RFC 1889; Jan. 1996; 75 pages.
Schulzrinne et al.; "RTP Profile for Audio and Video Conferences with Minimal Control"; Network Working Group; RFC 1890; Jan. 1996; 18 pages.
Schulzrinne et al.; "Real Time Streaming Protocol (RTSP)"; Network Working Group; RFC 2326; Apr. 1998; 92 pages.
Allman et al.; "TCP Congestion Control"; Network Working Group; RFC 2581; Apr. 1999; 14 pages.
Rhee et al.; "TEAR: TCP emulation at receivers—flow control for multimedia streaming"; NCSU Technical Report; Apr. 2000; 24 pages.

(56) References Cited

OTHER PUBLICATIONS

Rothermel et al.; "An Adaptive Stream Synchronization Protocol"; 5th Int'l Workshop on Network and Operating System Support for Digital Audio an Video; Apr. 1995; 12 pages.
Sen et al.; "Proxy Prefix Caching for Multimedia Streams"; Proceeding 18th Annual Conf. IEEE Computer and Communication Society; vol. 3; 1999; 26 pages.
Khan et al.; "Server-based and Network-assisted Solutions for Adaptive Video Streaming"; Int'l Journal of Advanced Networking and Applications; vol. 9(3); 2017; p. 3432-3442.
Sisalem et al.; The Loss-Delay Based Adjustment Algorithm: a TCP-Friendly Adaptation Scheme; In Proceedings of NOSSDAV; vol. 98; 1998; p. 215-226.
"SureStream™—Delivering Superior Quality and Reliability"; https://web.archive.org/web/20000301195603/http://www.realnetworks.com/devzone/library/whitepapers/surestrm.html; RealNetworks; Accessed Feb. 11, 2019; 3 pages.
Series H: Audiovisual and Multimedia Systems Infrastructure of audiovisual services—Coding of moving video; ITU-T H.262; International Telecommunication Union; Feb. 2000; 220 pages.
"Working With Realproducers 8 CODECS"; RealNetworks Technical Blueprint Series; RealNetworks Inc.; May 2000; 46 pages.
Zheng et al.; "Multimedia over ATM: Progress, Status and Future"; In Computer Communications and Networks; 1998; p. 114-121.
Zheng et al.; "Traffic Management of Multimedia over ATM Networks"; IEEE Communications Magazine; Jan. 1999; p. 33-38.
Zheng et al.; "Video on Demand over ATM: System Design and Networking Requirements"; ECOM; 1998; 10 pages.

\* cited by examiner

100

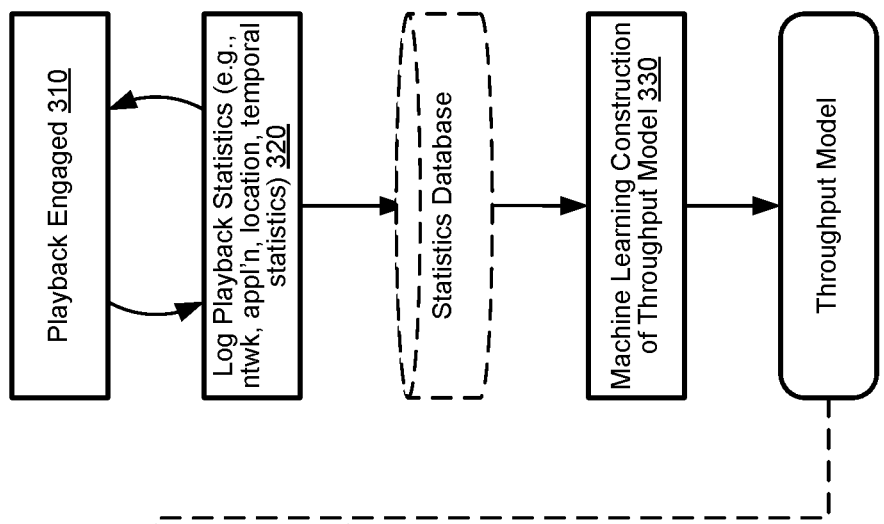
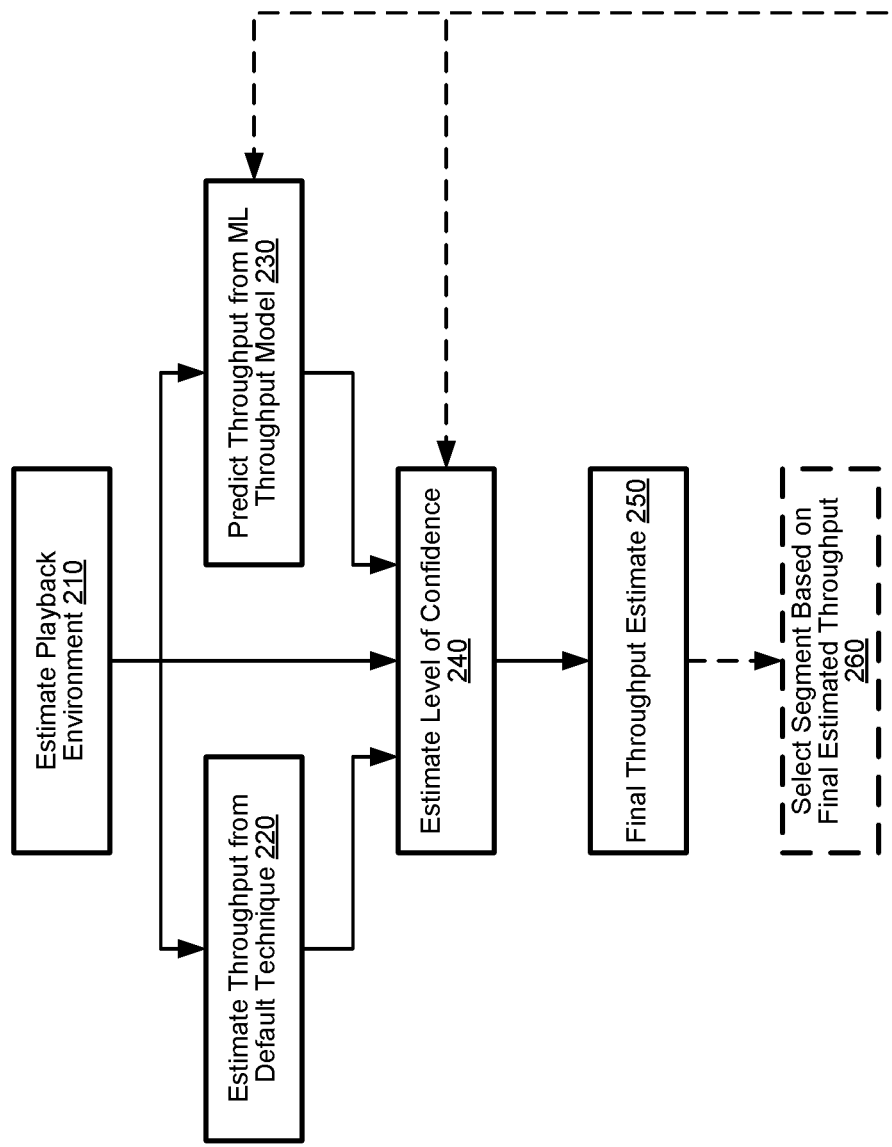

ON-DEVICE MACHINE LEARNING-BASED NETWORK BANDWIDTH PREDICTION TO IMPROVE ADAPTIVE MEDIA STREAMING PERFORMANCE

BACKGROUND

The present disclosure relates to network-based media streaming techniques and, in particular, to techniques for selecting from among different representations of media for download by a sink device involved in media streaming.

Network-based media players are common to modern consumer devices. When a user of a media player selects a media item to be played on their devices, the device typically retrieves a coded representation of the media item from a network source device, decodes the coded representation, and presents the decoded representation as commanded by the user (for example, by rendering the decoded representation at the device). Oftentimes, media may be made available in a variety of coded representations, which allows a sink device to select a representation that best matches its streaming environment, for example, by selecting a representation whose data rate requirements match throughput provided by a network through which a sink device accesses the media item.

A problem arises when a sink device must select a representation of media in a network environment when network throughput is unknown. Traditional techniques for estimating network throughput typically require observation of network throughput performance, which, in turn, require a sink device to exchange data with the network so that throughput performance may be measured. It often occurs that a streaming session is initiated at times where a sink device has had no meaningful opportunity to observe network performance and, therefore, the sink device has made no reliable network throughput estimates. In such cases, sink devices must select representations speculatively. For example, a sink device may select a low bitrate representation of media at the onset of the streaming session, which has a greater likelihood of being retrieved successfully over a network of unknown throughput than would a higher-bitrate representation of the media. This technique, however, would cause a lower quality-than-optimal representation of the media to be retrieved from a source device if network conditions could support retrieval of the higher bitrate segments.

BRIEF DESCRIPTION OF THE DRAWINGS

FIG. 2 illustrates a method according to an embodiment of the present invention.

FIG. 3 illustrates a method for building a throughput model according to an embodiment of the present invention.

DETAILED DESCRIPTION

Figure 1:
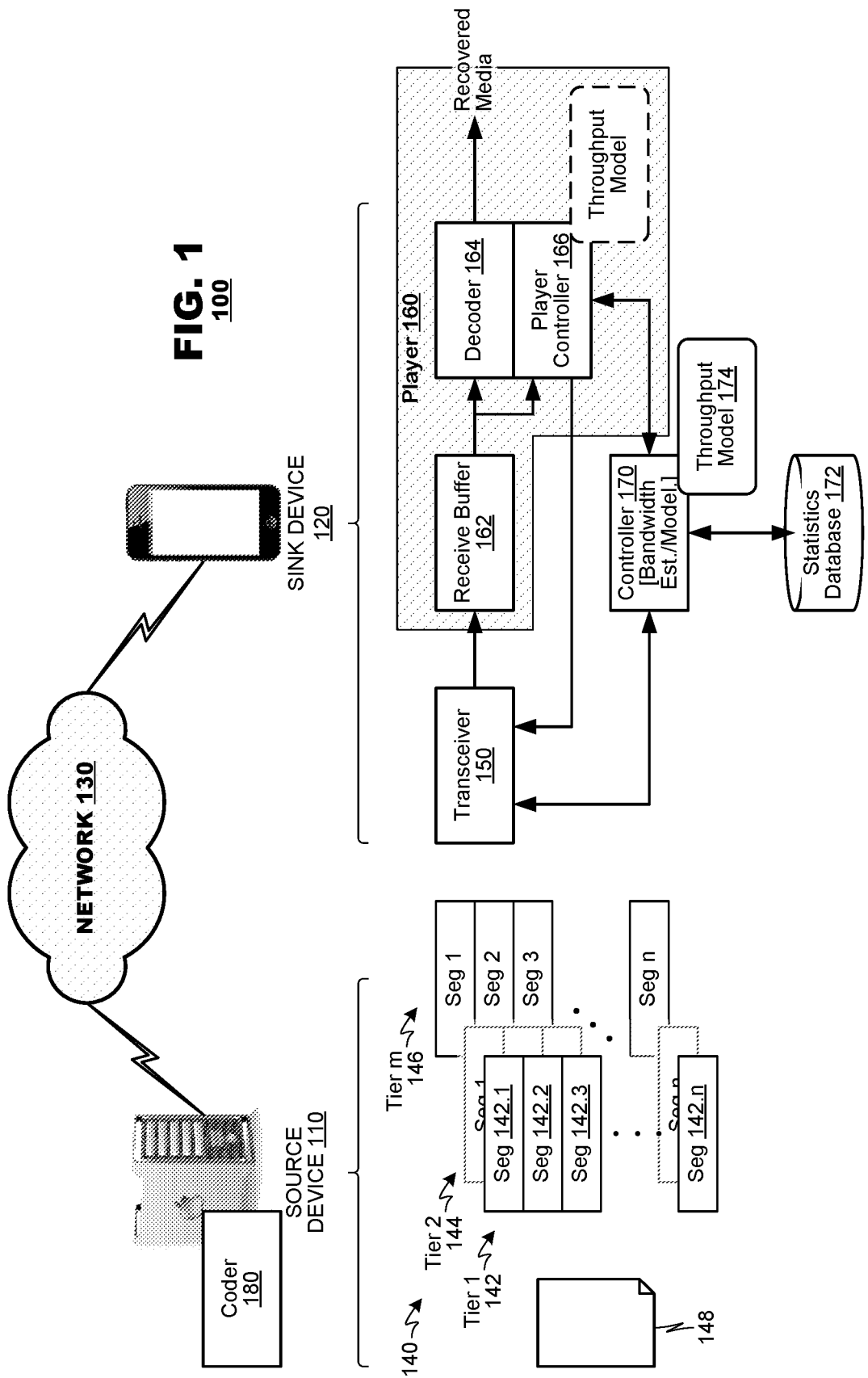
FIG. 1 is a block diagram of a media streaming system according to an embodiment of the present disclosure.

Embodiments of the present disclosure provide a media streaming method in which a network environment of a sink device engaged in media streaming is estimated and at least two network throughput estimates are developed. A first network throughput estimate may be developed from a measurement of network performance and a second network throughput estimate may be developed from a correlation of the estimated network environment to a machine learning model representing network throughput predictions. A final throughput estimate may be developed from the first and second network throughput estimates, and a representation of media content may be selected for retrieval based on the final throughput estimate. The machine learning model of network throughput may be developed over the course of prior media streaming session(s) that are performed by the sink device in which network throughput performance indicators of the streaming session(s) are stored over a predetermined interval and, upon conclusion of the interval, the model of network throughput is constructed according to a machine learning technique. Both the logging of network throughput performance indicators and the building of the model of network throughput may be performed solely by the sink device, which preserves confidentiality of data representing consumer behavior during those media streaming sessions.

FIG. 1 is a block diagram of a media streaming system 100 according to an embodiment of the present disclosure. The system 100 may include a media source device 110 provided in communication with a media sink device 120 via a network 130. The source device 110 may supply one or more media items 140 to the sink device 120 upon request.

The source and sink devices 110, 120 may operate according to one or more interface protocols that define how media items 140 are to be represented. Many streaming protocols, such as the HTTP Live Streaming protocol, the MPEG-DASH protocol, and others, permit media publishers to offer media items 140 in a variety of coding formats and a variety of representations. FIG. 1 illustrates a format of an exemplary media item 140 suitable for use with embodiments of the present disclosure. As illustrated, content of a media item 140 may be organized into a plurality of tiers 142, 144, 146, each of which contains a plurality of segments (e.g., 142.1-142.n). Each tier 142, 144, 146 may represent common content of the media item in different ways. For example, the different tiers may represent video of the media item at different frame sizes, at different frame rates, at different bit rates, and/or using video coding protocols. Within each tier, individual segments (e.g., 142.1-142.n) may represent content of the media item over a unique temporal interval. For example, a first segment 142.1 may contain a representation of the first five seconds of the media item's content, a second segment 142.2 may contain a representation of the next five seconds of the media item's content, and so on. The final segment 142.n of the tier 142 may represent content at the end of the media item 140. The segments 142.1-142.n from one tier 142 are temporally aligned with segments from other tiers 144, 146 along a media playback timeline.

Media items 140 often contain several independent channels of content. A media item 140, for example, may contain an audio channel representing audio content of the media item and a video channel representing the media item's video content. In many applications, audio content may be represented as multi-channel audio, providing parallel channels for stereo and/or spatial audio rendering applications. And, sometimes, a media item 140 may contain different video channels that are alternatives to each other; for example, a media item may contain multiple video sequences that represent content from different viewing perspectives. In such applications, the tiers 142-146 and segments may be replicated as desired for each channel of content. Providers of source content typically will tailor the number of channels and the number of tiers for each channel to suit their individual needs. The channels are not illustrated in FIG. 1 for simplicity's sake.

A media item 140 also may include a manifest file 148, which provides information regarding the channels that are available for the media item 140, the tiers 142-146 for each channel, characteristics of each tier (e.g., the tier's frame size, coding protocol, frame rate, and bit rate), and information identifying locations where the segments are available for download.

Typically, during a media streaming session, a sink device 120 downloads the manifest file 148 for a desired media item 140, which provides information to the sink device 120 regarding the channels, tiers, and segments of the media item 140 that are available at the source device 110. Thereafter, the sink device 120 may select and download segments (e.g., segments 142.1, 142.2, etc.) that are suitable for its local environment. For example, a sink device 120 may select segments from a tier 142 that matches an estimated amount of bandwidth provided by the network 130 for the media session or that matches the type of output device to which decoded media will be output. The sink device 120 may decode the downloaded media segments and output them to an associated rendering device. In many streaming sessions, the sink device 120 is commanded to play a media item 140 from beginning to end, but this does not occur in all cases. Many sink devices 120 support streaming modes that allow users to play media content out of order, for example, by skipping among media chapters, fast-forwarding, skipping backwards, etc.

It may occur that a sink device's local environment may change, which may cause the sink device 120 to select segments from among available tiers 142, 144, 146. For example, a network 130 may become congested, which may reduce the amount of bandwidth available to the sink device 120 and may cause the sink device 120 to select segments from a tier (say, tier 144) that are coded at a lower bit rate than the segments of a previously selected tier 142. Alternatively, the sink device 120 may transition from one type of network (example, a cellular network) to another type of network (a high bandwidth wireless network) that alters communication bandwidth. It can occur also that, during a media streaming session, a sink device 120 may output decoded data to one type of display device (e.g., a relatively large standalone display device) but switch its output to another type of display device (a display on a smaller handheld device). Thus, as the sink device's local environment changes, the sink device 120 may select segments from among the tiers 142, 144, 146 to suit the changing environment.

FIG. 1 also illustrates a simplified block diagram of a sink device 120. The sink device 120 may include a transceiver 150, a media player 160, and a controller 170. A transceiver 150 within the sink device 120 may communicate with the network 130 to issue requests for and manage retrieval of segments from the source device 110. Retrieved segments may be provided to a player 160 and stored in a receive buffer 162 within the player. A decoder 164 within the player 160 may drain segment data from the receive buffer 162 and decode the data to invert coding operations performed on the segments' content before they were made available at the source device 110 (represented by coder 180). Typically, the decoding operation generates media content that resembles source media content from which the segments were generated. Depending on the compression/decompression operations 180, 164 that are used, the recovered media may possess some errors when compared to the source media prior to coding. The recovered media may be output from the player 160, for example, for consumption by a display device, for storage on the sink device 120, or for consumption by another application that executes on the sink terminal 120 (not shown). The decoder 164 may be controlled by a player controller 166 that selects operational parameters of the decoder 164 according to metadata provided by the manifest file 148 and other metadata provided in the coded segments 142.1, 142.2, . . . , 142.n that identify, for example, a compression algorithm used to generate the segments 142.1, 142.2, . . . , 142.n and coding parameters used during application of the compression algorithm. The player controller 166 may select segments to be downloaded from the source device 110 and may interface with the transceiver 150 to issue commands over the network 130 to retrieve them.

The controller 170 may operate as a bandwidth estimator that estimates network resources that are available to the player 160 by the network 130. The controller 170, for example, may collect data from the transceiver 150 representing network performance and data from the player controller 166 regarding selections of segments in response to the observed network performance. The controller 170 may compile estimates of prior network behavior and segment selections into predictions of network bandwidth, shown as a throughput model 174, which the controller 170 may apply to develop a throughput estimate for the player controller 166. The controller 170 may build the throughput model 174 from statistics 172 compiled from previous streaming sessions conducted by the sink device 120. The controller's bandwidth estimates also may integrate throughput predictions from the throughput model 174 with bandwidth estimates performed from other sources, such as network performance measured during a current streaming session. The player controller 166 may select segments 142.1, 142.2, . . . , 142.n for a new streaming session from the controller's bandwidth estimates.

FIG. 2 illustrates a method 200 according to an embodiment of the present invention. The method 200 may operate iteratively on a sink device throughout a media streaming session. An iteration of the method 200 may begin by estimating characteristics of a playback environment (box 210). The method 200 may estimate network throughput from a default estimation technique (box 220) that represents a measurement of throughput at a sink device 120 (FIG. 1). In parallel, the method 200 may estimate network throughput from a machine learning throughput model (box 230). The method 200 may estimate a level of confidence of the two estimates (box 240) and derive a final throughput estimate (box 250) for the streaming session. The throughput estimate may be supplied to a player 160 (FIG. 1), for example, as a basis to select segments from among tiers of service 142-146 for the media streaming session. The method 200 may be repeated as desired during progression of a media streaming session, for example, at the onset of a media streaming session, each time a playback environment is estimated to change, on each interval when a player 160 selects a new segment for download from the source device 110 (FIG. 1), or on a predetermined temporal basis.

Default estimation techniques (box 220) may be performed in a variety of ways. Oftentimes, however, default estimation techniques require observation of a playback environment for a time before they develop reliable estimates. For example, a sink device 120 (FIG. 1) may measure receive data rates at a transceiver 150 as segment data is received from the network 130. Alternatively, a sink device 120 (FIG. 1) may estimate network throughput based on a state of a player's receive buffer 162. A sink device 120 may select segments from one tier (say, tier 142) on a speculative basis at the onset of a streaming session, which would cause segments to be stored in the receive buffer 162 prior to decode. The sink device 120 may compare a rate at which the segments' data enters the receive buffer 162 to a rate at which the segments' data is drained from the receive buffer 162. A comparison of these rates may lead to an estimate of network performance. In both instances, however, these estimates of network performance can begin only after download of segments has begun. The sink device 120 likely has no a priori knowledge of the network throughput before the sink device 120 requests the first segments from the source device 110.

In such an application, model-based throughput prediction (box 230) may supply a prediction of network throughput at the onset of a media streaming session. Throughput predictions may be made based, for example, on information that identifies a network 130 (FIG. 1) to which the sink device 120 is connected at the onset of the media streaming session. For example, the sink device 120 may store information that identifies the network to which it is connected, either by an identifier of the type of the connected network (e.g., WiFi vs. cellular), an identifier of the connected network (e.g., a WiFi network's name or an identifier of a cellular network service provider), or an identifier of connected network equipment (e.g., a router model or performance information, cellular tower identifiers or performance information). In such instances, the throughput model may store predictions of throughput that are correlated to such identifiers, and the method 200 may generate a throughput prediction (box 230) based on the identifiers.

Estimations of level of confidence (box 240) may be performed in a variety of ways. In one embodiment, estimates of level of confidence may be made based on an estimated reliability of the default throughput estimation technique (box 220). As explained, at the onset of a media streaming session, a default throughput estimation technique may be assigned a low level of confidence simply because the streaming session is in an early stage of operation and the default estimation technique lacks a sufficient history of network performance from which to make a reliable estimate.

Over time, when the sink device is operated in an environment with stable network throughput, reliability of the default throughput estimation technique likely will increase. The default throughput estimation technique will make throughput estimates for new media segments to be downloaded, and the method 200 may compare those throughput estimates to throughput that the sink device 120 observes as those segments are downloaded. Errors in the throughput estimates obtained by the default estimation technique may be computed, the throughput estimation may be revised, and, eventually, the throughput estimate may converge to some range that is determined to be stable. When errors in the throughput estimates converge to within a predetermined threshold value, the level of confidence assigned to the default throughput estimation technique may increase to a maximum value.

Alternatively, a level of confidence may be estimated from an estimation of correlation between characteristics of the estimated playback environment and characteristics on which the throughput model has been constructed. As explained, the throughput model may be developed from analysis of network performance observed over prior media streaming sessions, which are correlated to the networks (identified by, for example, network types and/or network names) over which those streaming sessions were conducted. The model, however, may provide a weak basis for prediction of network throughput when a new streaming session is performed in a playback environment that the sink device has never encountered (e.g., it is performed over a new type of network or a new network). Thus, correlation between estimated playback environment and characteristics on which the throughput model is constructed may form another basis to estimate a level of confidence.

Computations of final throughput estimates (box 250) also may be performed in a variety of ways. In one embodiment, a normalized level of confidence C may be computed for the default throughput estimation technique based on an estimated reliability of the default estimation technique. Throughput estimates from the two techniques (boxes 220, 230) may be weighted according to the level of confidence C, which may be assigned to the estimate obtained from the default throughput estimation technique, and a reciprocal value 1−C, which may be assigned to the estimate obtained from the model-based throughput estimation technique.

In another embodiment, the level of confidence value C may be set to zero during an initial phase of a streaming session, until actual network delivery rates have been observed for a predetermined amount of time. In this embodiment, the final throughput estimate may be obtained entirely from the model-based throughput estimation technique during this initial phase, regardless of any estimated reliability ascribed to the default throughput estimation technique.

And, of course, when a level of confidence is estimated based on a correlation between characteristics of the playback environment and network characteristics recorded in the throughput model, a normalized level of confidence C may be computed based on this correlation and the reciprocal level of confidence 1−C may be assigned to the estimation obtained from the default throughput estimation technique.

The method 200 of FIG. 2 also finds applications in circumstances where a sink device (FIG. 1) changes networks while a streaming session is underway. During a streaming session, a sink device 120 may transition from one network type to another (e.g., from a WiFi network to a cellular network) or from one network node to another (e.g., from one WiFi router or relay node to another or from one cellular tower to another in a handoff operation). These events effectively transition the sink device 120 from a first network environment for which the sink device 120 may have developed a reliable estimate of network throughput to a second network environment for which the sink device 120 where throughput is unknown. In this case, the method 200 may reset the estimated level of confidence C to a value that applies when the sink device 120 has no a priori knowledge of network throughput and perform another iteration of the method 200.

FIG. 3 illustrates a method 300 according to an embodiment of the present disclosure for building a throughput model for the method of FIG. 2. The method 300 may operate on a sink device as a background process while the sink device 120 (FIG. 1) is engaged in a streaming session (box 310). During such operations, the method 300 may collect and log statistics related to the streaming session. Typically, the method 300 collects statistics of streaming session(s) that are conducted over predetermined intervals during operation of the sink device 120. For example, the method 300 may collect statistics on session(s) conducted over a daily interval, a multi-day interval, or (for battery-operated sink devices) over intervals between device charging operations. As a result, operation of boxes 310-320 may collect statistics on multiple streaming sessions as they occur during the defined intervals, represented by the database illustrated in FIG. 3. The statistics database 172 is illustrated in FIG. 1; it may be maintained by the controller 170 (FIG. 1) during operation of the sink device 120.

The method 300 may build a throughput model using a machine learning technique (box 330) from content accumulated in the statistics database 172 (FIG. 1). A machine learning network may generate a throughput model for use in the method 200 of FIG. 2. The throughput model, for example, may generate throughput estimates that are correlated to characteristics of the playback environment that can be detected in box 210 (FIG. 2). The throughput model, therefore, may provide a basis for the method 200 to predict network throughput for a new streaming session by comparing characteristics of a playback environment detected in box 210 to environmental characteristics identified in the throughput model. The throughput model may be developed by a controller 170 of a sink device 120; it is represented as throughput model 174 in FIG. 1.

It is expected that operation of the method 300 of FIG. 3, both the collection of statistics and the development of the throughput model, will occur entirely on a sink device 120 (FIG. 1). In this manner, operation of the method 300 aligns with privacy initiatives that protect against centralized collection of consumer behavior. In this manner, the methods 200, 300 of FIGS. 2 and 3 may be applied to consumer electronic devices such as mobile phones, tablet computers, personal computers and laptops, and consumer media players without exposing collected statistics of consumer behavior (e.g., contents of the statistics database 172 (FIG. 1)) to external devices. It may occur that a single consumer will own multiple consumer devices (e.g., both a mobile phone and a tablet computer) and will have recorded its common ownership of those devices in the devices by, for example, a common user ID. In an embodiment, devices that are assigned to a common user ID may exchange compiled statistics information to compile throughput models from streaming session statistics of the common owner.

Playback statistics may be compiled (box 320) from a variety of sources. In many applications, throughput is determined to a large degree by the network 130 to which the sink device 120 is connected. The playback statistics may store network identification information such as the type of network to which the sink device is connected (e.g., WiFi, cellular, Ethernet), an identifier of the network (e.g., in a WiFi application, each WiFi network's name (a home network vs. an office network, etc.), in a cellular application, each cellular network's name and status (e.g., a home network, a roaming network), or a type of network equipment and performance standards associated with them (e.g., in an WiFi application, which revision of IEEE 802.11 is supported by the network equipment to which the sink device 120 is connected, or, in a cellular application, which interface specification (e.g., 5G, 4G, etc.) is supported). Playback statistics also may store performance information regarding those media streaming sessions, such as signal-to-noise measurements, bit error rates and other information that indicates variances of network throughput during those media streaming sessions. In many modern networking applications, it often occurs that WiFi networks provide higher network throughput to sink devices 120 than do cellular networks. WiFi equipment often supports higher data rates than cellular equipment and they often have shorter transmission paths to sink devices 120 which can lower the likelihood of transmission errors. The playback statistics database 172 may maintain information on such performance characteristics of streaming sessions.

Playback statistics also may store contextual information such the time of day in which the streaming sessions were conducted, GPS and/or micro-location(s) from which the streaming sessions were conducted, and identifiers of service providers engaged in the media streaming session. In modern streaming applications, source content providers may program their source devices to limit data rates (commonly, to "throttle" data rates) according to predetermined policies, many of which are determined by source device loading. Similarly, some network service providers such as providers of cellular services perform data rate throttling based on network loading or based on consumer network usage. In both instances, device loading events can have temporal characteristics that are determined by the timing of requests for service made from among the consuming public at large. Even in the absence of over throttling controls applied by source devices 110 or providers of network 130 services, network congestion events may cause variations in the throughput that individual sink devices 120 experience during streaming sessions; in a home WiFi network, for example, the throughput that is available to a single sink device 120 may be determined in part by demands made on the network 130 by other sink devices (not shown in FIG. 1) that compete for network throughput. Sink devices 120 (FIG. 1) may store information regarding the time(s)-of-day at which streaming sessions are conducted and the throughput that the sink device 120 observed during such streaming sessions.

Construction of the throughput model (box 330) may be performed in a variety of ways. A machine learning method may be applied to the statistics accumulated in the statistics database 172 (FIG. 1). For example, the method 300 may apply a Random Forrest machine learning technique (discussed, at the time of this writing, at https://www.stat-.berkeley.edu/~breiman/RandomForests/), a Gradient Boosted Tree algorithm (discussed at https://jerryfriedman-.su.domains/ftp/trebst.pdf), or a Neural Network algorithm to build a throughput model from the accumulated statistics. In practice, the machine learning algorithm may build the throughput model at times when the sink device 120 ordinarily is inactive, such as in an overnight update cycle.

The foregoing discussion has presented the methods 200, 300 of FIGS. 2 and 3 for application in a controller 170 (FIG. 1) that operates as a processing element that is separate from a controller 166 of a player 160. As illustrated, the controller 170 provides bandwidth estimates to the player controller 166, and the player controller 166 selects segments for retrieval based on the throughput estimates. In another embodiment (shown in phantom in FIG. 1), the controller's throughput model may be integrated with the player controller 166. In such an application, the method 200 (FIG. 2) may select a segment based on the final estimated throughput determined in box 250 (box 260).

In this embodiment, statistics logged in boxes 310-320 (FIG. 3) may include information that identify characteristics of segments downloaded during prior media streaming sessions, including, for example, the bit rates of the segments, the rendering characteristics of recovered media (e.g., a size of display during rendering, a number of audio channels rendered, etc.), and/or coding formats of segments (which determines a selection of decoding type by the decoder 164). In such an application, the throughput model may correlate characteristics of network environment(s) to characteristics of media segments that are appropriate for such environments. When the method 200 (FIG. 2) estimates the playback environment (box 210) and predicts throughput, the prediction may include an evaluation of segment characteristics for a media item 140 to be played during the new streaming session as represented in the media item's manifest file 148 and a prediction of segments to be retrieve based on a correlation between those characteristics and characteristics of segments as represented in the throughput model.

The foregoing discussion has described operation of the embodiments of the present disclosure in the context of source and sink devices. Commonly, these components are provided as electronic devices. Sink devices and the controllers and players that operate within them can be embodied in integrated circuits, such as application specific integrated circuits, field programmable gate arrays and/or digital signal processors. Alternatively, they can be embodied in computer programs that execute on personal computers, notebook computers, tablet computers, mobile devices, media players and other consumer devices. Such computer programs typically are stored in physical storage media such as electronic-, magnetic- and/or optically-based storage devices, where they are read to a processor and executed. And, of course, these components may be provided as hybrid systems that distribute functionality across dedicated hardware components and programmed general-purpose processors, as desired.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. Unless described otherwise herein, any of the methods may be practiced in any combination.

We claim:

1. A media streaming method, comprising, on a sink device:
    estimating a network environment of the sink device engaged in media streaming, wherein the estimation of the network environment includes identifying a first service provider associated with a network to which the sink device is connected;
    developing a first network throughput estimate from measurement of network performance;
    developing a second network throughput estimate from a correlation of the estimated network environment to a machine learning model representing network throughput prediction(s) developed by the sink device from other streaming session(s), wherein the correlation is further determined based on an identifier of the first service provider and identifier(s) of other service provider(s) associated with the other streaming session(s);
    developing a final throughput estimate from the first and second network throughput estimates; and
    selecting a representation of media content for retrieval based on the final throughput estimate.

2. The method of claim 1, wherein developing the final throughput estimate includes weighting the first and second network throughput estimates according to a level of confidence from an estimated reliability of the first network throughput estimate.

3. The method of claim 2, wherein the level of confidence is assigned as a minimal value at an onset of a media streaming session.

4. The method of claim 2, wherein the level of confidence is estimated from a computation of throughput error estimates over the course of a media streaming session.

5. The method of claim 1, wherein developing the final throughput estimate includes weighting the first and second network throughput estimates according to a level of confidence from the correlation.

6. The method of claim 1, wherein the estimation of the network environment includes identifying a type of a network to which the sink device is connected, and the correlation determines a correlation between a first network type and a second network type(s) identified by the machine learning model.

7. The method of claim 1, wherein the estimation of the network environment includes identifying a name of a network to which the sink device is connected, and the correlation determines a correlation between a first network name and a second network name(s) identified by the machine learning model.

8. A media streaming sink device, comprising:
    a transceiver for operative connection to a communication network,
    a media player, including a media decoder and a player controller to select segments of a media item for retrieval by the transceiver according to a final throughput estimate and to decode by the media decoder, and
    a bandwidth estimator adapted to:
        estimate a network environment of the media streaming sink device engaged in media streaming, wherein the estimation of the network environment includes identifying a first service provider associated with a network to which the sink device is connected;
        develop a first network throughput estimate from measurement of network performance;
        developing a second network throughput estimate from a correlation of the estimated network environment to a machine learning model representing network throughput prediction(s) developed by the sink device from other streaming session(s), wherein the correlation is further determined based on an identifier of the first service provider and identifier(s) of other service provider(s) associated with the other streaming session(s); and
        develop the final throughput estimate from the first and second network throughput estimates.

9. The device of claim 8, wherein developing the final throughput estimate includes weighting the first and second network throughput estimates according to a level of confidence from an estimated reliability of the first network throughput estimate.

10. The device of claim 9, wherein the level of confidence is assigned as a minimal value at an onset of a media streaming session.

11. The device of claim 9, wherein the level of confidence is estimated from a computation of throughput error estimates over the course of a media streaming session.

12. The device of claim 8, wherein the bandwidth estimator is integrated into the player controller.

13. The device of claim 8, wherein the bandwidth estimator is provided in a processing device external to the player controller.

14. The device of claim 8, wherein developing the final throughput estimate includes weighting the first and second network throughput estimates according to a level of confidence from the correlation of the estimated network environment to a machine learning model.

15. The device of claim 8, wherein the estimation of the network environment includes identifying a type of a network to which the media streaming sink device is connected, and the correlation determines a correlation between a first network type and a second network type(s) identified by the machine learning model.

16. The device of claim 8, wherein the estimation of the network environment includes identifying a name of a network to which the sink device is connected, and the correlation determines a correlation between a first network name and a second network name(s) identified by the machine learning model.

17. A non-transitory computer readable medium storing program instructions that, when executed by a processing device of a sink device, cause the processing device to:
   estimate a network environment of a sink device engaged in media streaming;
   develop a first network throughput estimate from measurement of network performance, wherein the estimation of the network environment includes identifying a first service provider associated with a network to which the sink device is connected;
   develop a second network throughput estimate from a correlation of the estimated network environment to a machine learning model representing network throughput predictions, the model developed by the sink device from other streaming session(s);
   develop a final throughput estimate from the first and second network throughput estimates, wherein the correlation is further determined based on an identifier of the first service provider and identifier(s) of other service provider(s) associated with the other streaming session(s); and
   select a representation of media content for retrieval based on the final throughput estimate.

18. The non-transitory computer readable medium of claim 17, wherein developing the final throughput estimate includes weighting the first and second network throughput estimates according to a level of confidence from an estimated reliability of the first network throughput estimate.

19. The non-transitory computer readable medium of claim 17, wherein developing the final throughput estimate includes weighting the first and second network throughput estimates according to a level of confidence from the correlation.

* * * * *